(12) United States Patent
Wang

(10) Patent No.: US 11,910,077 B2
(45) Date of Patent: Feb. 20, 2024

(54) CAMERA DEVICE

(71) Applicant: HUAWEI TECHNOLOGIES CO., LTD., Shenzhen (CN)

(72) Inventor: Guoqing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 17/243,871

(22) Filed: Apr. 29, 2021

(65) Prior Publication Data

US 2021/0250484 A1    Aug. 12, 2021

Related U.S. Application Data

(63) Continuation of application No. PCT/CN2019/090279, filed on Jun. 6, 2019.

(30) Foreign Application Priority Data

Nov. 1, 2018  (CN) .......................... 201821792890.4

(51) Int. Cl.
*H04N 23/52*    (2023.01)
*H04N 7/18*    (2006.01)
(Continued)

(52) U.S. Cl.
CPC ............... *H04N 23/52* (2023.01); *H04N 7/18* (2013.01); *H04N 23/51* (2023.01);
(Continued)

(58) Field of Classification Search
CPC .......... H04N 23/52; H04N 7/18; H04N 23/51; H05B 1/0227; H05B 3/84; H05B 2203/013; H05B 2203/016
See application file for complete search history.

(56) References Cited

U.S. PATENT DOCUMENTS

2003/0193603 A1* 10/2003 Parulski ............. H04N 1/00164
                                                  348/333.12
2014/0118179 A1*  5/2014 Alland .................. G01S 13/867
                                                       342/22
(Continued)

FOREIGN PATENT DOCUMENTS

CN    103376566 A    10/2013
CN    104473616 A     4/2015
(Continued)

OTHER PUBLICATIONS

European Search Report issued in corresponding European Application No. 19880852.9, dated Nov. 21, 2019, pp. 1-8, European Patent Office, Munich, Germany.
(Continued)

*Primary Examiner* — Fabio S Lima
(74) *Attorney, Agent, or Firm* — HAUPTMAN HAM, LLP

(57) ABSTRACT

A camera device including a housing, and a radio frequency circuit, a communications module, and a heating drive circuit that are disposed in the housing. The housing is provided with a window panel, and the window panel is provided with a hole to form a window. The window is provided with a window lens capable of receiving and transmitting a radio frequency signal, and the window lens is provided with a first terminal. The radio frequency circuit is connected to the communications module, and the radio frequency circuit and the heating drive circuit are provided with a common second terminal. The first terminal is electrically connected to the second terminal, to form a radio frequency channel including the communications module, the radio frequency circuit, and the window lens, and a heating channel including the heating drive circuit and the window lens.

20 Claims, 5 Drawing Sheets

(51) Int. Cl.
  *H05B 1/02* (2006.01)
  *H05B 3/84* (2006.01)
  *H04N 23/51* (2023.01)

(52) U.S. Cl.
  CPC ............ *H05B 1/0227* (2013.01); *H05B 3/84* (2013.01); *H05B 2203/013* (2013.01); *H05B 2203/016* (2013.01)

(56) References Cited

U.S. PATENT DOCUMENTS

| | | |
|---|---|---|
| 2015/0321621 A1 | 11/2015 | Van Dan Elzen et al. |
| 2017/0061748 A1* | 3/2017 | Graham ................. G08B 5/002 |
| 2017/0093018 A1* | 3/2017 | Wang ....................... H01Q 1/36 |
| 2017/0264796 A1* | 9/2017 | Tian ....................... B64D 47/08 |
| 2018/0297521 A1 | 10/2018 | Dayan et al. |
| 2019/0163038 A1* | 5/2019 | Peel ........................ F16M 11/06 |
| 2020/0317130 A1* | 10/2020 | Miethig .................. B60R 11/04 |
| 2022/0336945 A1* | 10/2022 | McCorkle .............. H01Q 9/045 |

FOREIGN PATENT DOCUMENTS

| | | |
|---|---|---|
| CN | 104777893 A | 7/2015 |
| CN | 206441860 U | 8/2017 |
| WO | 2010144900 A1 | 12/2010 |

OTHER PUBLICATIONS

International Search Report issued in corresponding International Application No. PCT/CN2019/090279, dated Aug. 28, 2019, pp. 1-9.

\* cited by examiner

CAMERA DEVICE

CROSS-REFERENCE TO RELATED APPLICATIONS

This application is a continuation of International Application No. PCT/CN2019/090279, filed on Jun. 6, 2019, which claims priority to Chinese Patent Application No. 201821792890.4, filed on Nov. 1, 2018. The disclosures of the aforementioned applications are hereby incorporated by reference in their entireties.

TECHNICAL FIELD

This application relates to the field of security protection devices, and in particular, to a camera device.

BACKGROUND

A camera, especially a surveillance camera, is widely used in the field of security protection, to collect a video image of a monitored area. In some scenarios, the surveillance camera needs to have a wireless network transmission function, for example, a cellular network function, a Wi-Fi function, and a Bluetooth function, and a wireless perception function, for example, a radio frequency identification (RFID) function and a radar function. Therefore, the camera needs to be provided with an antenna used to receive and transmit a line signal. As shown in FIG. 1, an antenna of a surveillance camera usually extends out of a housing of the camera. In this disposing manner, the housing of the camera needs to be provided with a hole or a connection structure of the antenna. Therefore, structural strength of the camera is affected. In particular, in a scenario in which the surveillance camera needs to be concealed, an external antenna causes the surveillance camera to be less concealed and to occupy more space. In addition, the surveillance camera is usually disposed outdoors. Therefore, when outdoor ambient temperature is relatively low, a lens of the surveillance camera is prone to get foggy or frosty. As a result, normal working of the camera is affected.

SUMMARY

This application provides a camera device, to resolve a prior-art problem that a camera is less concealed due to an antenna disposed on a housing of the camera, and a prior-art problem that a lens is prone to get foggy or frosty when the camera device works in a low-temperature environment.

According to a first aspect, this application provides a camera device, including a housing, and a radio frequency circuit, a communications module, and a heating drive circuit that are disposed in the housing, where the housing is provided with a window panel, and the window panel is provided with a hole to form a window; the window is provided with a window lens capable of receiving and transmitting a radio frequency signal, and the window lens is provided with a first terminal; the radio frequency circuit is connected to the communications module, and the radio frequency circuit and the heating drive circuit are provided with a common second terminal; and the first terminal is electrically connected to the second terminal, to form a radio frequency channel including the communications module, the radio frequency circuit, and the window lens, and a heating channel including the heating drive circuit and the window lens.

According to the foregoing camera device provided above, after being processed by the radio frequency circuit, a communication signal generated by the communications module is sent in a form of the radio frequency signal through the window lens. Alternatively, the window lens receives a radio frequency signal of another wireless communications device, and sends, to the communications module, the radio frequency signal processed by the radio frequency circuit, to implement data exchange between the camera device and the another wireless communications device. Therefore, the housing of the camera device does not need to be provided with an antenna, and the camera device is more concealed. In addition, the heating drive circuit heats the window lens, to solve a problem that the window lens of the camera device is prone to get foggy or frosty when ambient humidity is comparatively high or ambient temperature changes greatly.

With reference to the first aspect, in a first possible implementation of the first aspect, the window lens includes a lens layer and a transparent radiation medium attached to the lens layer; and the first terminal is disposed at an edge of the window lens, and is connected to the transparent radiation medium.

In this case, the window lens receives and transmits a video signal through the transparent radiation medium, so that the lens layer may be made of an optical material having a light transmission characteristic, for example, quartz glass, resin, sapphire (a main component is aluminum oxide), aluminum-silicon reinforced glass, or the like, provided that the transparent radiation medium is attached to the optical material. In addition, the heating drive circuit enables, by applying a current to the transparent radiation medium, the transparent radiation medium to emit heat to remove fog or frost from the lens layer. This ensures that the window lens has a capability of receiving and transmitting the radio frequency signal and a defrosting capability, and maintains good light transmittance at the same time. In addition, manufacturing costs are reduced.

With reference to the first possible implementation of the first aspect, in a second possible implementation of the first aspect, the transparent radiation medium is a radiation thin layer made of a transparent radiation material, and the radiation thin layer is attached to one side of the lens layer or embedded inside the lens layer.

In this case, after being attached to the radiation thin layer, the lens layer may become the window lens that receives and transmits the radio frequency signal, so that production costs are comparatively low. In addition, if the lens layer is accidentally damaged in use, the lens layer is replaceable, so that the camera device in this application continues to work normally, and usage costs are reduced. In addition, if the radiation thin layer is embedded inside the lens layer, when the heating drive circuit heats the radiation thin layer, heat may be fully used by the lens layer to improve a defrosting effect.

With reference to the first possible implementation of the first aspect, in a third possible implementation of the first aspect, the transparent radiation medium is an antenna pattern drawn by using a transparent radiation coating.

In this case, after the antenna pattern is drawn on the lens layer, the optical lens has a capability of receiving and transmitting the radio frequency signal and a defrosting capability.

With reference to the third possible implementation of the first aspect, in a fourth possible implementation of the first aspect, the window lens further includes a thin film base layer, the antenna pattern is drawn on the thin film base layer, and the thin film base layer is attached to one side of the lens layer.

In this case, the lens layer and the thin film base layer may be separated. In a case in which the lens layer is accidentally damaged, the lens layer is replaceable, so that the camera device in this application continues to work normally, and usage costs are reduced.

With reference to the first aspect, in a fifth possible implementation of the first aspect, the communications module includes one or more of a wireless communication module such as a Wi-Fi™ module, an LTE module, a 5G NR module, an RFID module, a ZigBee™ module, a Bluetooth™ module, and a radar module.

In this case, different communications modules may be selected, so that the camera device communicates with another wireless communications device in different communications protocols.

With reference to the first aspect, in a sixth possible implementation of the first aspect, the first terminal and the second terminal are thin film terminals used in pairs, and the first terminal is connected to the second terminal by compressing.

In this case, the thin film terminal has a comparatively small volume, and is easier to be mounted in a camera device with comparatively small window space.

With reference to the first aspect, in a seventh possible implementation of the first aspect, the first terminal and the second terminal are multi-pin terminals used in pairs, and the first terminal is connected to the second terminal by plugging.

In this case, the plug connection of the multi-pin terminal is more securely connected, and reliability of a radio frequency function and a defrosting function of the camera device is improved.

With reference to the first aspect, in an eighth possible implementation of the first aspect, the housing is a bullet housing, and the window panel is disposed on a bottom surface of the bullet housing.

With reference to the first aspect, in a ninth possible implementation of the first aspect, the housing is a dome housing, and the window panel is disposed on a tangent plane of the dome housing.

In this case, the camera device provided in this application may be a bullet camera device, a dome camera device, or a camera device in another form, and may be widely applied to different application scenarios and environments, to implement data exchange between the camera device in each form and another wireless communications device. Therefore, the housing of the camera device does not need to be provided with the antenna, and the camera is more concealed. In addition, the problem that the window lens of the camera device is prone to get foggy or frosty when the ambient humidity is comparatively high or the ambient temperature changes greatly is resolved.

DESCRIPTION OF EMBODIMENTS

To make a person skilled in the art understand the technical solutions in this application better, the following clearly describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

Figure 1:
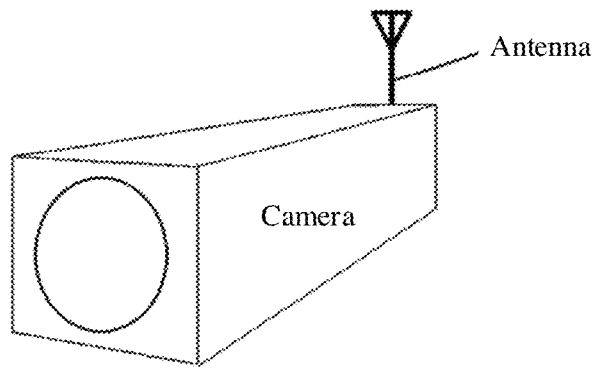
FIG. 1 is a schematic diagram of a camera antenna in a prior art.
Figure 2:
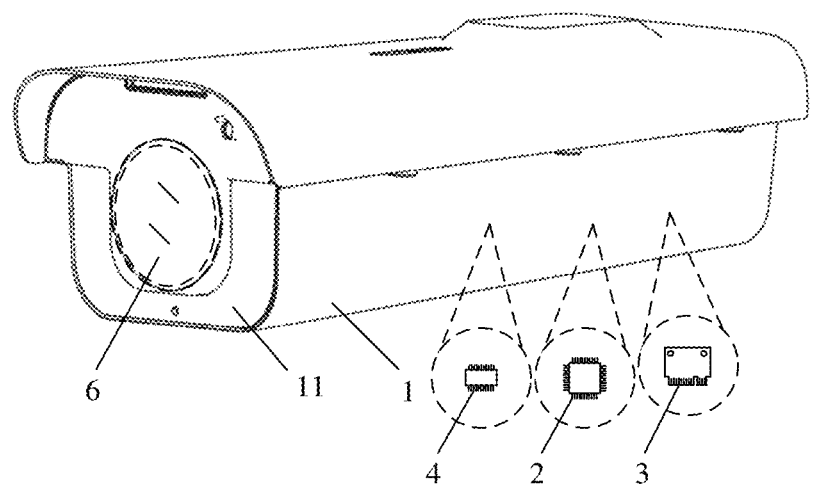
FIG. 2 is a schematic diagram of a structure of a camera device according to this application.
Figure 3:
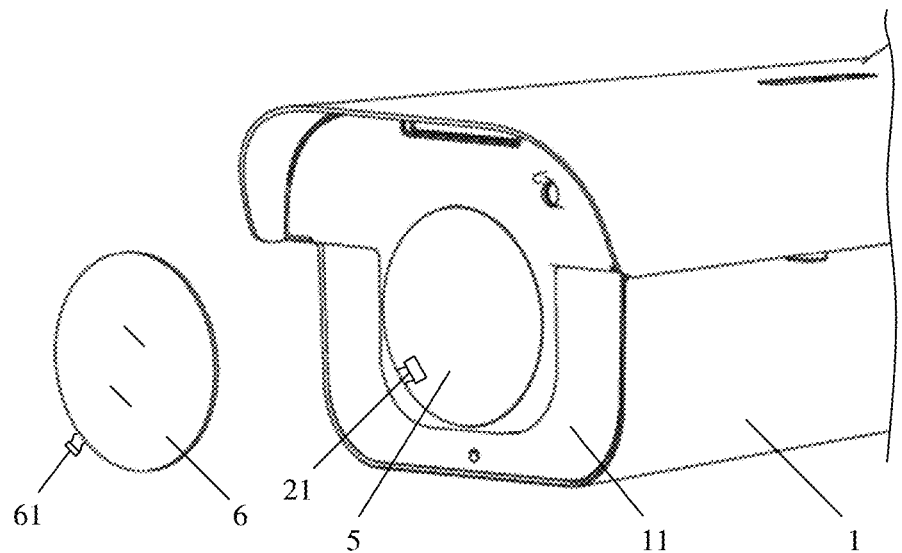
FIG. 3 is an exploded view of a window of a camera device according to this application.
Figure 4:
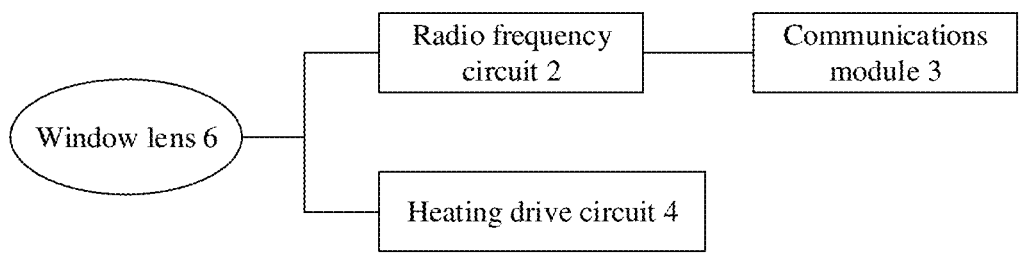
FIG. 4 is a schematic diagram of a circuit connection of a camera device according to this application.

An embodiment of this application provides a camera device. FIG. 2 is a schematic structural diagram of a camera device according to this application. FIG. 3 is an exploded view of a window of a camera device according to this application. FIG. 4 is a schematic diagram of a circuit connection of a camera device according to this application.

As shown in FIG. 2, FIG. 3, and FIG. 4, the camera device includes a housing 1, and a radio frequency circuit 2, a communications module 3, and a heating drive circuit 4 that are disposed in the housing 1. The housing 1 is provided with a window panel 11, and the window panel 11 is provided with a hole to form a window 5. The window 5 is provided with a window lens 6 capable of receiving and transmitting a radio frequency signal, and the window lens 6 is provided with a first terminal 61. The radio frequency circuit 2 is connected to the communications module 3, and the radio frequency circuit 2 and the heating drive circuit 4 are provided with a common second terminal 21. The first terminal 61 is electrically connected to the second terminal 21, to form a radio frequency channel including the communications module 3, the radio frequency circuit 2, and the window lens 6, and a heating channel including the heating drive circuit 4 and the window lens 6.

The housing 1 is configured to seal and protect an electronic device in the camera device, and enable the camera device to present in different forms. The housing 1 may be made of a metal material, for example, iron, aluminum, or an alloy thereof, or may be made of plastic, for example, ABS resin, polycarbonate, or the like.

The radio frequency circuit 2 in the housing 1 is configured to generate, based on a data signal generated by the communications module 3, a waveform signal that carries data. The waveform signal is usually an alternating current signal. After the waveform signal is sent to the window lens 6, the window lens 6 excites the radio frequency signal, to transmit data to another wireless communications device through the radio frequency signal. Another camera device having an external antenna also includes the radio frequency circuit 2 and the communications module 3. Therefore, a specific circuit structure, a product specification, and the like of the radio frequency circuit 2 and the communications module 3 are not specifically limited in this application. A person skilled in the art may independently select a corresponding radio frequency circuit 2 and a corresponding communications module 3 based on factors such as manufacturing costs of a camera device and an expected compatible communications protocol. These designs and concepts that can be implemented herein do not go beyond the protection scope of the embodiments of this application.

In addition, the heating drive circuit 4 is configured to generate a heating current. The heating current acts on the window lens 6, and makes the window lens 6 emit heat, thereby enabling fog or frost attached to the window lens 6 to melt and evaporate, and preventing the window lens 6 from getting moisture condensed or frosty. The heating current may be a direct current, so that no interference is caused to the waveform signal generated by the radio frequency circuit 2. This ensures that a wireless communication capability of the camera device is not affected when the camera device performs a defogging operation and a defrosting operation. The heating drive circuit 4 may adjust temperature and a temperature change speed of the window lens 6 by controlling a magnitude and duration of the heating current, to keep the temperature of the window lens 6 within a proper range (for example, higher than zero degrees Celsius, and keep a difference between the temperature of the window lens 6 and ambient temperature within a preset range). Therefore, an effect of defogging and defrosting is achieved, and it is ensured that the window lens 6 is not damaged due to excessively high temperature or that a structure of the window 5 is not damaged by overheating. The heating drive circuit 4 may be a common temperature control circuit in the field. Therefore, a specific circuit structure, a product specification, and the like of the heating drive circuit 4 are not specifically limited in this application. A person skilled in the art may select a corresponding heating drive circuit 4 based on factors such as a product specification of a camera device, a use environment, and a size, a thickness, and heat-resistant temperature of a window lens 6. These designs and concepts that can be implemented herein do not go beyond the protection scope of the embodiments of this application.

In addition, the first terminal 61 may be disposed at an edge of the window lens 6, so that window framing of the camera device is not affected. The second terminal 21 may be disposed on an inner wall of the window 5 and close to a fixed position of the window lens 6. Therefore, after the window lens 6 is fixed on the window 5, the first terminal 61 and the second terminal 21 are detachably connected, so that the radio frequency channel and the heating channel are in a conducting state.

According to the foregoing camera device provided above, after being processed by the radio frequency circuit 2, a communication signal generated by the communications module 3 is sent in a form of the radio frequency signal through the window lens 6. Alternatively, the window lens 6 receives a radio frequency signal of another wireless communications device, and sends, to the communications module 3, the radio frequency signal processed by the radio frequency circuit 2, to implement data exchange between the camera device and the another wireless communications device. Therefore, the housing of the camera device does not need to be provided with the antenna, and the camera device is more concealed. In addition, the heating drive circuit 4 heats the window lens 6, to solve a problem that the window lens of the camera device is prone to get foggy or frosty when ambient humidity is comparatively high or ambient temperature changes greatly.

Figure 5:
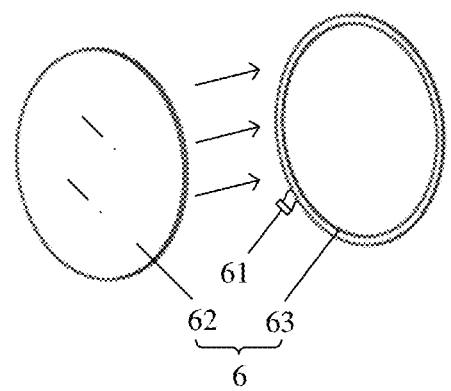
FIG. 5 is an exploded view of a structure of a window lens of a camera device according to this application.

FIG. 5 is an exploded view of a structure of a window lens of a camera device according to this application.

In an embodiment, as shown in FIG. 5, the window lens 6 includes a lens layer 62 and a transparent radiation medium 63 attached to the lens layer 62. A first terminal 61 is disposed at an edge of the window lens 6, and is connected to the transparent radiation medium 63. The lens layer 62 may be made of an optical material having a light transmission characteristic, for example, quartz glass, resin, sapphire (a main component is aluminum oxide), aluminum-silicon reinforced glass, or the like. The transparent radiation medium 63 may be made of a material such as graphene or nano silver, so that the transparent radiation medium 63 has electromagnetic radiation performance and power-on heating performance, and has good light transmittance. The first terminal 61 is connected to the transparent radiation medium 63. When the first terminal 61 is electrically connected to a second terminal 21, a radio frequency channel includes a communications module 3, a radio frequency circuit 2, and the transparent radiation medium 63, and a heating channel includes a heating drive circuit 4 and the transparent radiation medium 63. When the communications module 3 and the radio frequency circuit 2 work, the transparent radiation medium 63 transmits or receives a radio frequency signal, to implement data communication with another wireless communications device. When the heating drive circuit 4 works, the transparent radiation medium 63 emits heat (for example, the graphene is a good heat radiation medium), and the lens layer 62 is heated, so that fog or frost are removed from the lens layer 62. This ensures that the window lens 6 has a capability of receiving and transmitting the radio frequency signal and a defrosting capability, and maintains the good light transmittance at the same time. In addition, manufacturing costs are reduced.

Figure 6:
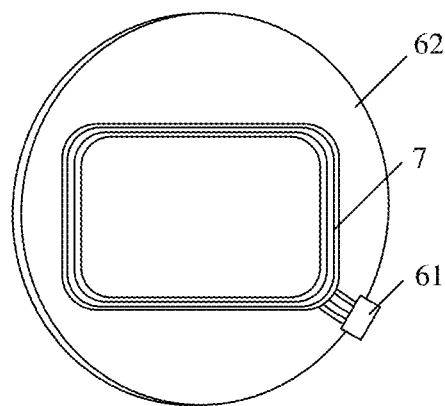
FIG. 6 is a schematic diagram of a structure of a window lens of a camera device according to this application.

FIG. 6 is a schematic structural diagram of a window lens of a camera device according to this application.

Figure 7:
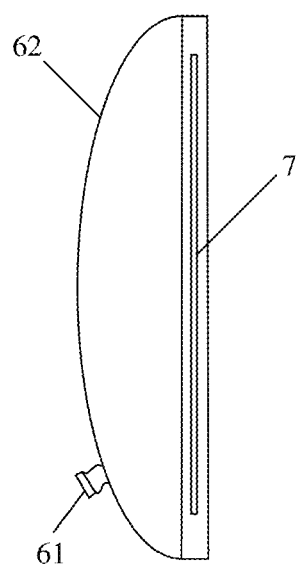
FIG. 7 is a schematic diagram of a structure of a window lens of another camera device according to this application.

FIG. 7 is a schematic structural diagram of a window lens of another camera device according to this application.

In an embodiment, a transparent radiation medium 63 is a radiation thin layer 7 made of a transparent radiation material, and the radiation thin layer 7 is attached to one side of a lens layer 62 or embedded inside the lens layer 62. For example, the transparent radiation material may be graphene, indium tin oxide (indium tin oxide, ITO), fluorine-doped tin oxide (FTO), or the like. Correspondingly, the radiation thin layer 7 may be a graphene thin layer, an ITO thin film, an FTO thin film, or the like. Based on a communications protocol used for wireless communication and that is on an antenna form, the radiation thin layer 7 may be designed in various shapes, such as a rectangle, a circle, or another shape. Therefore, a shape of the radiation thin layer 7 is not specifically limited in this application. A person skilled in the art may independently design the shape based on use and experience. These designs and concepts that can be implemented herein do not go beyond the protection scope of the embodiments of this application.

Further, as shown in FIG. 6, as long as the radiation thin layer 7 is attached to one side of the lens layer 62, the window lens 6 capable of receiving and transmitting a radio frequency signal is formed. Therefore, production costs are comparatively low. In addition, if the lens layer 62 is accidentally damaged in use, the lens layer 62 is replaceable, so that the camera device in this application continues to work normally, and usage costs are reduced.

Further, as shown in FIG. 7, the radiation thin layer 7 may be directly embedded inside the lens layer 62 when the lens layer 62 is manufactured. For example, when the lens layer 62 made of a resin material is formed through solute forming, the radiation thin layer 7 is embedded in liquid resin. Therefore, after the lens layer 62 is formed, the radiation thin layer 7 is embedded inside the lens layer 62. Because the radiation thin layer 7 is located inside the lens layer 62, when a heating drive circuit heats the radiation thin layer 7, heat may be fully used by the lens layer 62 to improve a defrosting effect.

Figure 8:
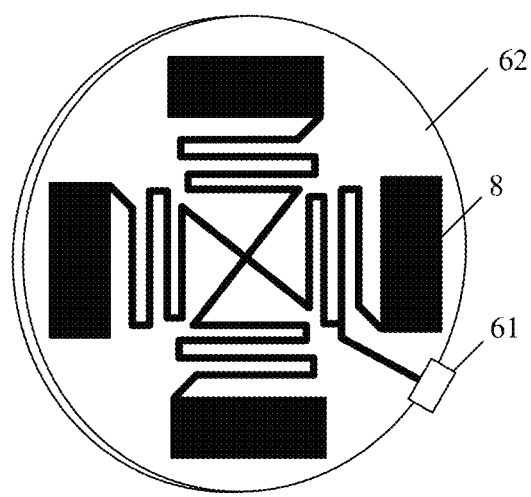
FIG. 8 is a schematic diagram of a structure of a window lens of still another camera device according to this application.

FIG. 8 is a schematic structural diagram of a window lens of still another camera device according to this application.

In an embodiment, as shown in FIG. 8, a transparent radiation medium 63 is an antenna pattern 8 drawn by using a transparent radiation coating. For example, the transparent radiation coating may be a graphene coating, an indium tin oxide coating, a fluorine-doped tin oxide coating, nano-silver paste, or the like. The transparent radiation coating may be drawn on a surface of a lens layer 62 through laser engraving, spraying, hot stamping, printing, or the like, to form the antenna pattern 8.

It should be additionally noted that a pattern of the antenna pattern 8 shown in FIG. 8 is merely an example. Based on a communications protocol used for wireless communication and that is on an antenna form, the antenna pattern 8 may be drawn into various patterns. Therefore, a drawn pattern of the antenna pattern 8 is not specifically limited in this application. A person skilled in the art may independently design the pattern based on use and experience. These designs and concepts that can be implemented herein do not go beyond the protection scope of the embodiments of this application.

Figure 9:
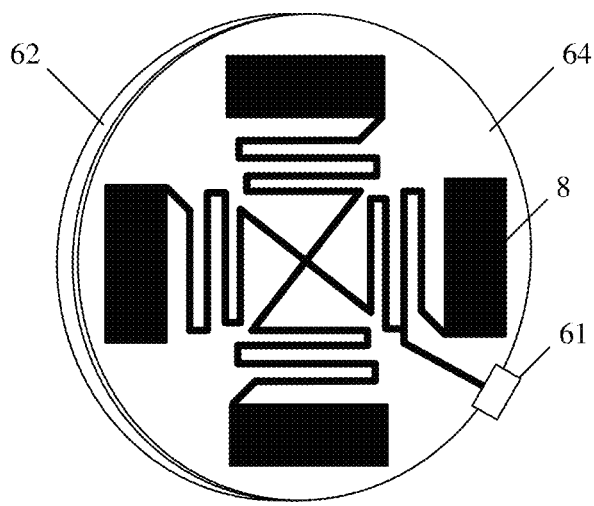
FIG. 9 is a schematic diagram of a structure of a window lens of still another camera device according to this application.

FIG. 9 is a schematic structural diagram of a window lens of still another camera device according to this application.

In an implementation, as shown in FIG. 9, the window lens 6 further includes a thin film base layer 64. An antenna pattern 8 is drawn on the thin film base layer 64, and the thin film base layer 64 is attached to one side of a lens layer 62. The thin film base layer 64 may be made of a plastic material, such as polyethylene terephthalate (PET), polycarbonate, or flexible glass. The thin film base layer 64 may be sticky, for ease of being securely attached to one side of the lens layer 62.

In this case, the lens layer 62 and the thin film base layer 64 may be separated. In a case in which the lens layer 62 is accidentally damaged, the lens layer 62 is replaceable, so that the camera device in this application continues to work normally, and usage costs are reduced. In addition, when a heating drive circuit 4 generates a heating current, heat generated by the antenna pattern 8 is first transferred to the thin film base layer 64, and is diffused at the thin film base layer 64. Then the heat is transferred to the lens layer 62, so that the lens layer 62 is heated evenly. This helps to improve a defogging effect and a defrosting effect.

In some embodiments, a communications module 3 includes one or more of a wireless communication module such as a Wi-Fi™ module, an LTE (long term evolution, long term evolution) module, a 5G NR (5th generation mobile networks new radio, new air interface technology) module, an RFID (radio frequency identification) module, and a ZigBee™ module, a Bluetooth™ module, and a radar module.

For example, the Wi-Fi module may be a Wi-Fi module that supports a single frequency band, for example, a Wi-Fi module that supports a 2.4 GHz frequency band, or a Wi-Fi module that supports a 5 GHz frequency band. Alternatively, the Wi-Fi module may be a Wi-Fi module that supports dual frequency bands, for example, a Wi-Fi module that supports both a 2.4 GHz frequency band and a 5 GHz frequency band. For example, a communications standard supported by the Wi-Fi module may be any one or more of 802.11a/b/g/n/ac/ax. This is not specifically limited in this application. These designs and concepts that can be implemented herein do not go beyond the protection scope of the embodiments of this application.

For example, the LTE module may be compatible with the LTE standard and the LTE-A (LTE-Advanced, Long Term Evolution-Advanced technology) standard, and may be specifically compatible with a standard such as LTE-FDD (frequency division duplex) or LTE-TDD (time division duplex). This is not specifically limited in this application. These designs and concepts that are implemented herein do not go beyond the protection scope of the embodiments of this application.

For example, the RFID module may be a transponder module, configured to provide electronic code that is identified by another RFID device. Alternatively, the RFID module may be a reader module, configured to read information from another RFID label.

For example, the Bluetooth module may be any one or more Bluetooth modules that are compatible with Bluetooth 2.0, 3.0, 4.0, and 5.0 standards, and provides a Bluetooth discovery function. Therefore, the Bluetooth module may be discovered by a wireless device that supports a Bluetooth communications protocol, and a connection is established.

For example, the radar module enables a camera device to have functions such as measuring a size of a target, measuring a moving speed of the target, and measuring a distance of the target. The radar module may send an electromagnetic wave to the measured target through a window lens 6, and receive a reflected electromagnetic wave of the target, to measure the size, the moving speed, and the distance of the target.

In some embodiments, a first terminal 61 and a second terminal 21 are thin film terminals used in pairs, and the first terminal 61 is connected to the second terminal 21 by compressing. The thin film terminal is a common electrical connection component in an electronic device such as a mobile phone, a laptop computer, or a tablet computer. The thin film terminal is small sized and is easier to be installed in a camera device with comparatively small space of a window 5. A person skilled in the art may select a thin film terminal of an appropriate specification based on factors such as a size of the space of the window 5, and output power of a radio frequency circuit 2 and a heating drive circuit 4. A specification of the thin film terminal is not specifically limited in this application.

In some other embodiments, a first terminal 61 and a second terminal 21 are multi-pin terminals used in pairs, and the first terminal 61 is connected to the second terminal 21 by plugging. The multi-pin terminal is a common component for an electrical connection, and has higher connection strength than the thin film terminal. Therefore, the multi-pin terminal may be applied to a camera device in a harsh working condition (for example, strong wind, frequent vibration, or device transportation), to ensure reliability of a radio frequency function and a defrosting function of the camera device.

It should be additionally noted that, in addition to the thin film terminal and the multi-pin terminal provided in the foregoing embodiments, a person skilled in the art may implement, in another connection manner, an electrical connection between the window lens 6 and the radio frequency circuit 2 and an electrical connection between the window lens 6 and the heating drive circuit 4 at the same time. Other possible connection manners are not further listed in the embodiments of this application, and these designs and concepts that are implemented herein do not go beyond the protection scope of the embodiments of this application.

In some embodiments, as shown in FIG. 2 and FIG. 3, the housing 1 is a bullet housing, and the window panel 11 is disposed on a bottom surface of the bullet housing.

Figure 10:
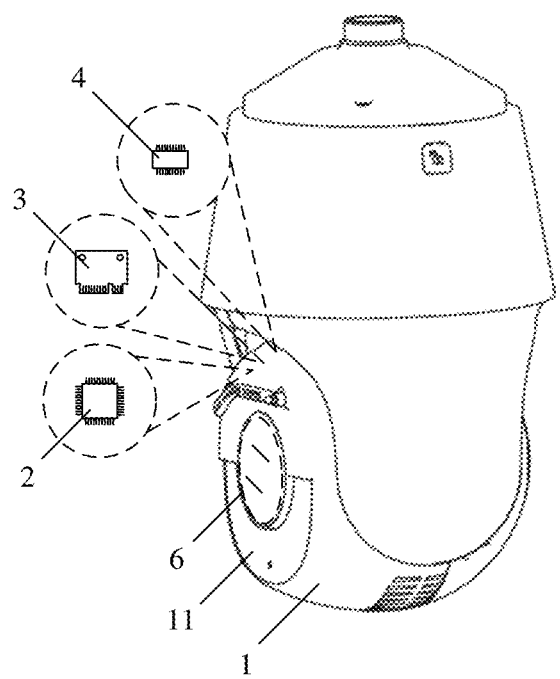
FIG. 10 is a schematic diagram of a structure of a camera device with a dome housing according to this application.

FIG. 10 is a schematic structural diagram of a camera device with a dome housing according to this application.

Figure 11:
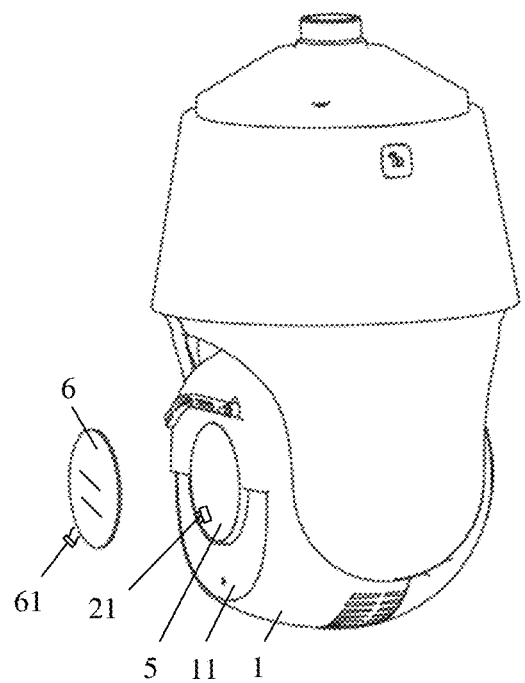
FIG. 11 is an exploded view of a window of a camera device with a dome housing according to this application.

FIG. 11 is an exploded view of a window of a camera device with a dome housing according to this application.

In some other embodiments, as shown in FIG. 10 and FIG. 11, a housing 1 is the dome housing, and a window panel 11 is disposed on a tangent plane of the dome housing.

It should be further noted that, in addition to the housing forms shown in the foregoing embodiments, the camera device provided in this application may further have a plurality of other housing forms, including but not limited to a gun shape, a hemispherical shape, a multi-ocular shape, a semi-shield spherical shape, and the like.

In this case, the camera device provided in this application may be a bullet camera device, a dome camera device, or a camera device in another form, and may be widely applied to different application scenarios and environments, to implement data exchange between the camera device in each form and another wireless communications device. Therefore, the housing of the camera device does not need to be provided with the antenna, and the camera is more concealed. In addition, the problem that the window lens of the camera device is prone to get foggy or frosty when the ambient humidity is comparatively high or the ambient temperature changes greatly is resolved.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device.

A person skilled in the art can easily figure out another implementation solution of this application after considering the specification and practicing this application that is disclosed herein. This application is intended to cover any variations, functions, or adaptive changes of this application. These variations, functions, or adaptive changes comply with general principles of this application, and include common knowledge or a commonly used technical means in the technical field that is not disclosed in this application. The specification and the embodiments are merely considered as examples, and the actual scope and the spirit of this application are pointed out by the following claims.

It should be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. A camera device, comprising:
a housing including a window panel, wherein the window panel includes a hole to form a window;
a radio frequency circuit;
a communications module; and
a heating drive circuit, wherein the radio frequency circuit, the communications module and the heating drive circuit are in the housing; a window lens in the window, wherein the window lens is capable of receiving and transmitting a radio frequency signal;
a first terminal in the window lens; wherein
the radio frequency circuit is connected to the communications module, and the radio frequency circuit and the heating drive circuit include a common second terminal; and
the first terminal is electrically connected to the second terminal to form a radio frequency channel comprising the communications module, the radio frequency circuit, and the window lens, and a heating channel comprising the heating drive circuit and the window lens.

2. The camera device according to claim 1, wherein the window lens comprises a lens layer and a transparent radiation medium attached to the lens layer; and
the first terminal is disposed at an edge of the window lens, and is connected to the transparent radiation medium.

3. The camera device according to claim 2, wherein the transparent radiation medium includes a radiation thin layer comprising a transparent radiation material, and the radiation thin layer is attached to one side of the lens layer or embedded inside the lens layer.

4. The camera device according to claim 2, wherein the transparent radiation medium includes an antenna pattern comprising a transparent radiation coating.

5. The camera device according to claim 4, wherein the window lens further comprises a thin film base layer, the antenna pattern is on the thin film base layer, and the thin film base layer is attached to one side of the lens layer.

6. The camera device according to claim 1, wherein the communications module comprises one or more of a long term evolution (LTE) module, a fifth-generation new radio (5G NR) module, a radio frequency identification (RFID) module, or a radar module.

7. The camera device according to claim 1, wherein the first terminal and the second terminal are thin film terminals usable in pairs, the first terminal electrically connected to the second terminal.

8. The camera device according to claim 1, wherein the first terminal and the second terminal are multi-pin terminals usable in pairs, the first terminal releasably connected to the second terminal.

9. The camera device according to claim 1, wherein the housing includes a bullet housing, and the window panel is on a bottom surface of the bullet housing.

10. The camera device according to claim 1, wherein the housing includes a dome housing, and the window panel is on a tangent plane of the dome housing.

11. A camera, comprising:
a housing including a window panel, wherein the window panel includes a hole to form a window;
a window lens in the window, wherein the window lens is capable of receiving and transmitting a radio frequency signal;
a radio frequency circuit;
a communications module operatively connected to the radio frequency circuit; and
a heating drive circuit, wherein the radio frequency circuit, the communications module and the heating drive circuit are in the housing; and
a first terminal in the window lens; wherein
the radio frequency circuit is connected to the communications module, and the radio frequency circuit and the heating drive circuit include a common second terminal; and
the first terminal is electrically connected to the second terminal to form a radio frequency channel comprising the communications module, the radio frequency circuit, and the window lens, and a heating channel comprising the heating drive circuit and the window lens.

12. The camera according to claim 11, further comprising:
a lens layer operatively connected to the lens; and
a transparent radiation medium operatively connected to the lens layer, wherein the first terminal is disposed at an edge of the lens and is operatively connected to the transparent radiation medium.

13. The camera according to claim 12, wherein
the transparent radiation medium includes a thin layer of a transparent radiation material, and the radiation thin layer is operatively connected to a first side of the lens layer or embedded inside the lens layer.

14. The camera according to claim 12, wherein the transparent radiation medium includes an antenna pattern comprising a transparent radiation coating.

15. The camera according to claim 14, further comprising:
a thin film base layer operatively attached to a first side of the lens layer on the lens, wherein the antenna pattern is comprised of the thin film base layer.

16. The camera according to claim 11, wherein
the communications module comprises one or more of a long term evolution (LTE) module, a fifth-generation new radio (5G NR) module, a radio frequency identification (RFID) module, or a radar module.

17. The camera according to claim 11, wherein
the first terminal and the second terminal are thin film terminals usable in pairs, the first terminal connected to the second terminal.

18. The camera according to claim 11, wherein
the first terminal and the second terminal are multi-pin terminals useable in pairs, the first terminal releasably connected to the second terminal.

19. The camera according to claim 1, wherein
the housing includes a bullet housing, and the window panel is on a bottom surface of the bullet housing.

20. The camera according to claim 1, wherein
the housing includes a dome housing, and the window panel is on a tangent plane of the dome housing.

* * * * *